May 16, 1939.    W. SCHADE    2,158,201

LENS

Filed Nov. 19, 1937

FIG. 1
*PRIOR ART*

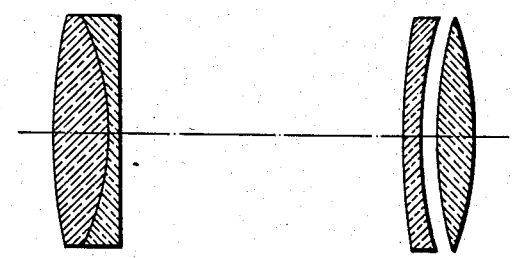

FIG. 2

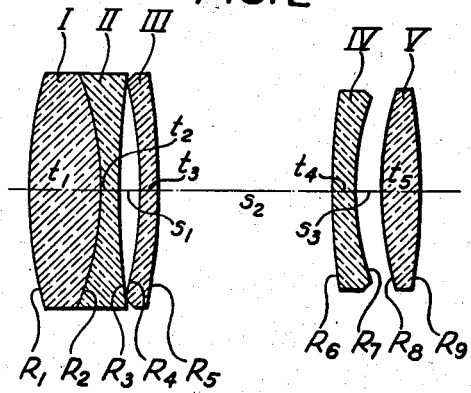

f/2.8    F = 100 mm.

| LENS | GLASS | RADII | SPACINGS |
|---|---|---|---|
| I | $N_D = 1.6109$<br>$\nu = 57.2$ | $R_1 = +60.0$ mm.<br>$R_2 = -38.5$ mm. | $t_1 = 12.0$ mm.<br>$t_2 = 3.0$ mm. |
| II | $N_D = 1.5750$<br>$\nu = 42.7$ | $R_3 = +498.0$ mm. | $s_1 = 2.0$ mm. |
| III | $N_D = 1.5224$<br>$\nu = 59.6$ | $R_4 = -83.9$ mm.<br>$R_5 = -940.0$ mm. | $t_3 = 3.0$ mm.<br>$s_2 = 27.5$ mm. |
| IV | $N_D = 1.6164$<br>$\nu = 36.6$ | $R_6 = +134.2$ mm.<br>$R_7 = +35.1$ mm. | $t_4 = 3.0$ mm.<br>$s_3 = 4.0$ mm. |
| V | $N_D = 1.6109$<br>$\nu = 57.2$ | $R_8 = +43.0$ mm.<br>$R_9 = -116.0$ mm. | $t_5 = 6.0$ mm. |

Willy Schade
INVENTOR

BY *Newton M. Purvis*
*Rolla L. Carter*
ATTORNEYS

Patented May 16, 1939

2,158,201

UNITED STATES PATENT OFFICE 2,158,201

LENS

Willy Schade, Rochester, N. Y., assignor to Eastman Kodak Company, Rochester, N. Y., a corporation of New Jersey Application November 19, 1937, Serial No. 175,474

7 Claims. (Cl. 88—57)

This invention relates to lens systems, and particularly to image forming lens systems such as are used in photography.

More specifically it relates to image forming systems of high magnification, i. e. systems which are particularly useful when employed to have conjugate images vastly different in size. In photography or cinematography, the image on the film is usually many times smaller than the original subject. In lantern slide or cinematographic projectors, the image on the screen is many times larger than that on the slide or film. It is an object of the invention to provide an objective particularly suitable for projection purposes or when reversed, for photographic purposes. For convenience, I include all such lenses under the self-explanatory term "high magnification image forming systems".

As a high magnification image forming lens, it is common practice to use a Petzval type of lens consisting of two widely spaced achromats, the one on the long focus side usually being a cemented doublet and the one on the short focus side being either a cemented or spaced doublet.

It is an object of the present invention to provide a modified Petzval lens system more highly corrected than hitherto. It is a particular object of the invention to provide such a modified Petzval type lens having the known advantages of such systems, namely, good correction of spherical aberration and coma, and also having reduced curvature of field and astigmatism.

In a concurrently filed application, Serial Number 175,473 I describe a modified Petzval lens system in which the rear component, i. e. the one on the short focus side is modified and which is capable of working at comparatively high relative apertures. The present invention is concerned specifically with the front component and has as its main object the improvement of curvature of field and other aberrations rather than in increasing the relative aperture. As I pointed out in this copending application, the two inventions may be combined with certain advantages, although from a commercial point of view the added improvement does not at present seem worth while over either system alone. On the other hand, this slight improvement on the lens described in this copending case is one of the minor objects of the present invention.

According to the invention, the front component of a Petzval type lens, that is the component toward the long focus side, is modified to include a negative air lens. The term "negative air lens" is used by those skilled in the art to describe an air space between two refractive substances such as glass, which air space has a marginal thickness less than its axial thickness. Obviously, this feature of a negative air lens is exactly opposite to that of the negative lens made of a high refractive medium bounded by a low refractive medium. In the invention, the negative air lens may be bi-convex, plano-convex or meniscus.

In the preferred embodiment of the invention this negative air lens is obtained by using a meniscus element spaced behind a doublet and concave thereto. The specific lens shown has a meniscus element in marginal contact with the rear surface of the doublet, which permits convenient assembly during manufacture. Described in other words, a front component made according to this invention may comprise a negative element (preferably meniscus) behind a doublet whose rear surface has a curvature more strongly positive than that of the front surface of the negative element.

Other objects and advantages of this lens will be apparent from the following description when read in connection with the accompanying drawing in which:

Fig. 1 shows a typical Petzval lens.

Fig. 2 shows a modified Petzval lens incorporating a preferred embodiment of the present invention.

The typical Petzval lens shown in Fig. 1 comprises two widely spaced achromats, the front one being a cemented doublet and the rear one being a spaced doublet. Many variations of this form have been investigated by workers in this field and many variations of the separate components have been proposed. For example, the rear component may have additional elements, may have the order of the elements reversed, and/or may include a cemented surface. Furthermore it has been pointed out that the two components need not be separately achromatic, but may be arranged so that under-correction in one component is compensated for in the other component. The present invention is not particularly concerned with this rear component and any of the variations taught in the prior art can probably be used therewith.

As shown in Fig. 2, the invention primarily concerns the front component which comprises an achromat (or an approximately achromatic component) including a negative air lens bounded by the refracting surfaces $R_3$ and $R_4$. In the arrangement shown the elements II and III are in marginal contact, but this feature which is convenient for assembly purposes is not at all necessary to the broad invention. The preferred embodiment shown has the following specifications:

| Lens | Glass | Radii | Spacings |
|---|---|---|---|
|  |  | Millimeter | Millimeter |
| I | $N_D=1.6109$<br>$\nu=57.2$ | $R_1=+60.0$<br>$R_2=-38.5$ | $t_1=12.0$ |
| II | $N_D=1.5750$<br>$\nu=42.7$ | $R_3=+498.0$ | $t_2=3.0$<br>$S_1=2.0$ |
| III | $N_D=1.5224$<br>$\nu=59.6$ | $R_4=-83.9$<br>$R_5=-940.0$ | $t_3=3.0$<br>$S_2=27.5$ |
| IV | $N_D=1.6164$<br>$\nu=36.6$ | $R_6=+134.2$<br>$R_7=+35.1$ | $t_4=3.0$<br>$S_3=4.0$ |
| V | $N_D=1.6109$<br>$\nu=57.2$ | $R_8=+43.0$<br>$R_9=-116.0$ | $t_5=6.0$ |

It will be noted in this preferred embodiment that the lens III is made of glass having an index refraction less than 1.55. This fact and the one that the element III is meniscus are not absolutely necessary, but these features assist in reducing the Petzval Sum and hence in giving reduced curvature of field.

The introduction of this element III greatly improves the astigmatism and curvature of field as compared with the arrangement shown in Fig. 1 and also improves the other aberrations slightly which are already highly corrected in the simple arrangement.

Having thus described the principle of my invention and the details of the preferred embodiment of it, I wish to point out that it is not limited to this specific structure but is of the scope of the appended claims.

I claim:

1. A high magnification image forming objective comprising two achromatic collective components spaced more than one-quarter of and less than twice the focal length of the objective, the component on the long focus side consisting of a cemented doublet whose cemented surface is convex to the other component and a negative meniscus lens in marginal contact with the inner element of the doublet.

2. A high magnification image forming objective comprising two achromatic collective components spaced more than one-quarter of and less than twice the focal length of the objective, the component on the long focus side consisting of a cemented doublet whose cemented surface has a radius of curvature less than either of its outer surfaces and greater than one-quarter of the focal length of the objective and a meniscus element concave to the doublet and between the doublet and the other component.

3. A high magnification image forming objective comprising two achromatic collective components spaced more than one-quarter of and less than twice the focal length of the objective, the component on the long focus side consisting of a negative element spaced behind a doublet.

4. A high magnification image forming objective comprising two achromatic collective components spaced more than one-quarter of and less than twice the focal length of the objective, the component on the long focus side consisting of a negative element spaced behind a doublet whose rear surface has a curvature more strongly positive than that of the front surface of the negative element.

5. An objective of the Petzval type, in which the front component includes a negative member behind a collective doublet.

6. An objective of the Petzval type, in which the front component consists of a negative meniscus lens convex to the rear component and spaced behind a compound member forming a negative air lens therewith.

7. An objective of the Petzval type in which the front component is made up of a plurality of lens elements, two of which are dispersive and enclose a negative air lens and in which the front one of said two dispersive elements is cemented to the rear of a collective element.

WILLY SCHADE.